(12) United States Patent
Hatcher et al.

(10) Patent No.: US 11,131,908 B2
(45) Date of Patent: Sep. 28, 2021

(54) ARTICULATING JOINT APPARATUS FOR A RECORDING DEVICE

(71) Applicant: Axon Enterprise, Inc., Scottsdale, AZ (US)

(72) Inventors: Jonathan Hatcher, Daytona Beach, FL (US); Daniel Orol, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 16/851,435

(22) Filed: Apr. 17, 2020

(65) Prior Publication Data

US 2020/0333692 A1    Oct. 22, 2020

Related U.S. Application Data

(60) Provisional application No. 62/836,576, filed on Apr. 19, 2019.

(51) Int. Cl.
   *G03B 17/56*   (2021.01)
   *F16M 11/10*   (2006.01)
   *F16M 13/04*   (2006.01)

(52) U.S. Cl.
   CPC .......... *G03B 17/561* (2013.01); *F16M 11/10* (2013.01); *F16M 13/04* (2013.01); *G03B 17/566* (2013.01); *F16M 2200/024* (2013.01)

(58) Field of Classification Search
   CPC ............................. G03B 17/561; F16M 11/10
   See application file for complete search history.

(56) References Cited

U.S. PATENT DOCUMENTS 5,761,844 A * 6/1998 Horschel ................ A01K 97/10
                                                            248/131
5,961,186 A   10/1999 Phillips
                    (Continued)

FOREIGN PATENT DOCUMENTS

JP          2014177951 A    9/2014
KR       1020180095178 A    8/2018

OTHER PUBLICATIONS

International Seraching Authority, International Search Report for International Patent Application No. PCT/US2020/028653, dated Jul. 28, 2020.

*Primary Examiner* — Clayton E. LaBalle
*Assistant Examiner* — Leon W Rhodes, Jr.
(74) *Attorney, Agent, or Firm* — Andrew Terajewicz

(57) ABSTRACT

An articulating joint for coupling an accessory to a support comprises a platform, a base, and a wedge. The platform couples to one of the support and the accessory, and the base couples to the other of the support and the accessory. The platform includes a hinge having a bore and teeth positioned radially around the bore. The base includes an undercut and a complementary hinge having a thru hole. The wedge includes complementary teeth positioned radially around a passageway and a ramp that cooperates with the undercut of the base. A shaft having a threaded portion engages a threaded insert to couple the hinge of the platform, the wedge, and the complementary hinge of the base. Rotating the shaft to a locked position causes the teeth of the platform to mesh with the complementary teeth of the wedge to retain the platform in an orientation relative to the base.

20 Claims, 3 Drawing Sheets

(56) References Cited

U.S. PATENT DOCUMENTS

| | | | | |
|---|---|---|---|---|
| 6,637,146 B2* | 10/2003 | Ernst | .................... | A01K 97/10 |
| | | | | 248/514 |
| 7,774,973 B2* | 8/2010 | Carnevali | .......... | F16M 11/2078 |
| | | | | 43/21.2 |
| 9,915,855 B1 | 3/2018 | Miyashita | | |
| 2014/0199859 A1 | 7/2014 | Jordan et al. | | |
| 2015/0294660 A1 | 10/2015 | Stokes et al. | | |
| 2015/0316205 A1 | 11/2015 | Bennett et al. | | |

* cited by examiner

US 11,131,908 B2

ARTICULATING JOINT APPARATUS FOR A RECORDING DEVICE

CROSS-REFERENCE TO RELATED APPLICATIONS

This application claims priority to, and the benefit of, U.S. Provisional Patent Application No. 62/836,576, filed on Apr. 19, 2019, and entitled "ARTICULATING JOINT APPARATUS FOR AN IMAGING DEVICE," which is herein incorporated by reference in its entirety.

FIELD OF INVENTION

Embodiments of the present invention relate to articulating couplers that enable mounting and articulation of an accessory relative to a support.

BACKGROUND

Public safety personnel, such as police officers and firefighters, may use cameras to capture events, so that a video and/or audio record exist of what happened in an incident. These cameras may be mounted on vehicles such as cars and drones, and they may also be worn on the body as body worn cameras. Numerous mounting systems exist to mount body worn cameras to personnel. These various mounting systems provide different vantage points. For instance, a body worn camera mounted using a chest mount will have a different vantage point compared to a body worn camera mounted on a shoulder, or epaulette, mount. While many mounting systems are designed to provide a consistent camera perspective, variations within body worn camera mounts as well as user variation lead to variations in the perspective captured by the camera.

Some mounts allow a user to modify the pitch of a body worn camera, however the articulation methods require bulky hardware, and sometimes require the user to use tools to modify the pitch of the camera.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION

Aspects of this disclosure relate to a low profile articulating joint configured to couple an accessory (e.g., camera, recording device, microphone, etc.) to a support (e.g., article of wear, uniform, etc.). The low profile articulating joint may enable the accessory to articulate relative to the support, such that the pitch of the accessory (and thus field of view for a camera), may be adjusted and secured in a desired orientation. The support may permanently or releasably couple to an article of wear and/or individual via a mounting system.

Figure 1A:
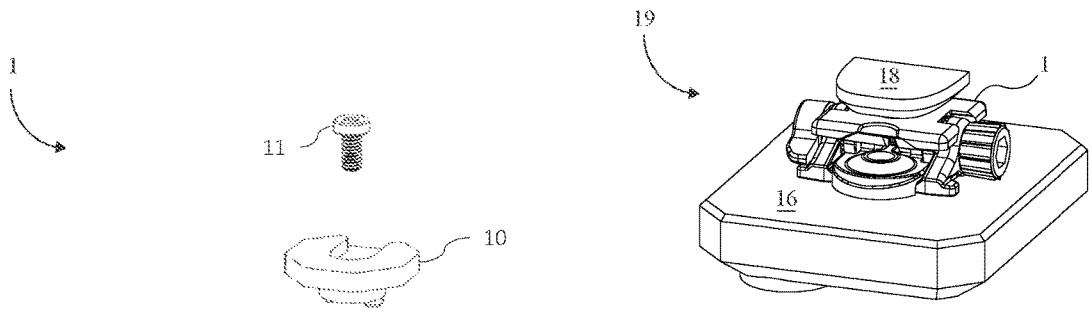
FIG. 1A is a perspective view of an implementation of an articulating joint system, according to one or more aspects described herein.

In various embodiments, an articulating joint system, such as articulating joint system 19 is disclosed. With reference to FIG. 1A, articulating joint system 19 may comprise an articulating joint 1, an accessory 16, and a support 18. Accessory 16 may comprise a device such as a recording device (e.g., digital video recorder, microphone, camera, etc.). Support 18 may comprise a structure on which accessory 16 is configured to be supported, such as an article of wear, a mount, a uniform, a helmet, etc. Articulating joint 1 may couple accessory 16 with support 18. In some embodiments, articulating joint 1 may be permanently coupled with accessory 16 and be configured to releasably engage support 18. For example, articulating joint 1 may be coupled with accessory 16 via fasteners, adhesives, etc. In other embodiments, articulating joint 1 may be permanently coupled with support 18 and be configured to releasably engage accessory 16. In yet other embodiments, articulating joint 1 may be configured to releasably engage both support 18 and accessory 16. In still other embodiments, articulating joint 1 may be permanently coupled with accessory 16 and support 18. Articulating joint 1 may be configured to enable accessory 16 to articulate relative to support 18. For example, articulating joint 1 may enable a user, such as a law enforcement officer, to position a body worn camera in a particular orientation to capture a particular field of view relative to his or her body.

Figure 1B:
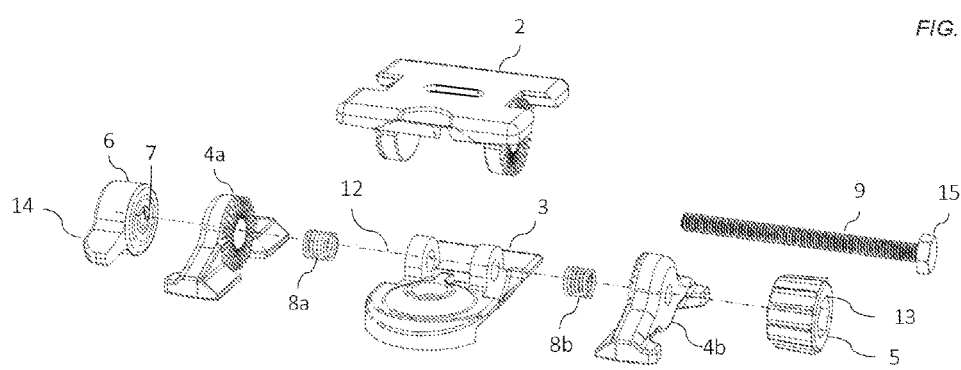
FIG. 1B is an exploded view of an implementation of an articulating joint, according to one or more aspects described herein.

In various embodiments, FIG. 1B depicts an exploded view of articulating joint 1. In various embodiments, one or more components of articulating joint 1 may be formed of one or more rigid, durable materials able to withstand force(s) applied to the articulating joint 1 during use. For example, one or more components of articulating joint 1 may include one or more rigid, plastic materials, metal materials, and/or composite materials. The one or more rigid materials may include corrosion-resistant materials, UV resistant materials, and/or any other suitable material configured to at least partially withstand environmental factors. Rigid materials may include metals and metallic alloys (e.g., aluminum, steel, titanium, etc.), composites (e.g., fiberglass, carbon fiber, etc.), plastics (e.g., polycarbonate, acrylonitrile butadiene styrene, polyether ether ketone, etc.), and/or the like. The rigid materials may also be treated (e.g., heat-treated, galvanized, anodized, etc.), painted (e.g., powder-coated, e-coated, etc.), and/or similarly modified to aid in withstanding environmental factors.

Articulating joint 1 may comprise an articulating platform, such as platform 2, and a unitary base, such as base 3. Platform 2 may be configured to couple to one of an accessory 16 and a support 18. In an embodiment, platform 2 may couple to one of accessory 16 and support 18 via coupler 10. Coupler 10 may be configured to releasably or permanently secure one of accessory 16 and support 18 to platform 2. For example, coupler 10 may be sized and shaped and/or comprise various coupling features to enable coupler 10 to releasably or permanently secure one of accessory 16 and support 18 to platform 2. Coupler 10 may be fastened to platform 2 via fastener 11. In another embodiment, coupler 10 is fastened to platform 2 via a double-sided adhesive. In yet another embodiment, coupler 10 is unitary with platform 2. A person of ordinary skill in the art will appreciate that any coupling device may be substituted for coupler 10, such as a male side of a bayonet mount, a female side of a bayonet mount, a cover and/or base as disclosed in U.S. Pat. No. 9,756,930, which is herein incorporated by reference in its entirety, etc.

Articulating joint 1 may comprise a first coupling wedge, such as first wedge 4a, a second coupling wedge, such as second wedge 4b, a knob 5, a first compression spring 8a, a second compression spring 8b, and/or a nub 6. A shaft with a threaded region, such as threaded fastener 9, may be configured to join first wedge 4a, second wedge 4b, knob 5, first compression spring 8a, second compression spring 8b, nub 6, and base 3. In various embodiments, first wedge 4a, second wedge 4b, knob 5, first compression spring 8a, second compression spring 8b, nub 6, and base 3 may be part of a base assembly coupled together via threaded fastener 9.

In an embodiment, threaded fastener 9 may comprise a bolt. Threaded fastener 9 may comprise a bolt having a head 15. Head 15 may comprise features configured to enable tightening and loosening of threaded fastener 9. For example, head 15 may be sized and shaped (e.g., square shaped, hexagonal shaped, etc.) to engage a wrench, a socket, and/or the like. Head 15 may also comprise features configured to engage a hex wrench, a slotted screwdriver, a Phillips screwdriver, and/or the like. Threaded fastener 9 may comprise a threaded surface configured to engage one or more components of articulating joint 1 and/or the base assembly. For example, an outer surface of threaded fastener 9 may entirely comprise a threaded surface. As a further example, only a portion of an outer surface of threaded fastener 9 may comprise a threaded surface. For example, in various embodiments wherein threaded fastener 9 is configured to engage nub 6 to join the base assembly, only an end portion of threaded fastener 9 distal head 15 may comprise a threaded surface. The end portion of threaded fastener 9 comprising the threaded surface may comprise dimensions configured to engage a threaded insert 7 of nub 6.

In various embodiments, threaded fastener 9 and knob 5 may comprise a unitary object. For example, knob 5 may comprise a head of threaded fastener 9. In that regard, rotation of knob 5 (e.g., clockwise or counterclockwise rotation) may similarly rotate threaded fastener 9. In various embodiments, knob 5 may be rigidly fastened with threaded fastener 9. For example, knob 5 may be heat staked (e.g., heat staked to threads and/or head 15), welded, or otherwise coupled to threaded fastener 9, thereby coupling rotation of knob 5 with threaded fastener 9 while also preventing threaded fastener 9 from disengaging knob 5. In various embodiments, threaded fastener 9 may be inserted through knob 5 to couple threaded fastener 9 to knob 5. For example, knob 5 may comprise a profile 13 defining a recessed opening on an outer surface of knob 5. Profile 13 may be sized and shaped to receive head 15 of threaded fastener 9. Head 15 of threaded fastener 9 may be configured to at least partially fit within profile 13 of knob 5, whereby profile 13 couples rotation of threaded fastener 9 with knob 5. In various embodiments, knob 5 may comprise structural features, surface coatings, and/or the like configured to provide a gripping surface, such as, for example, a knurled surface configured to improve grip.

Figure 5:
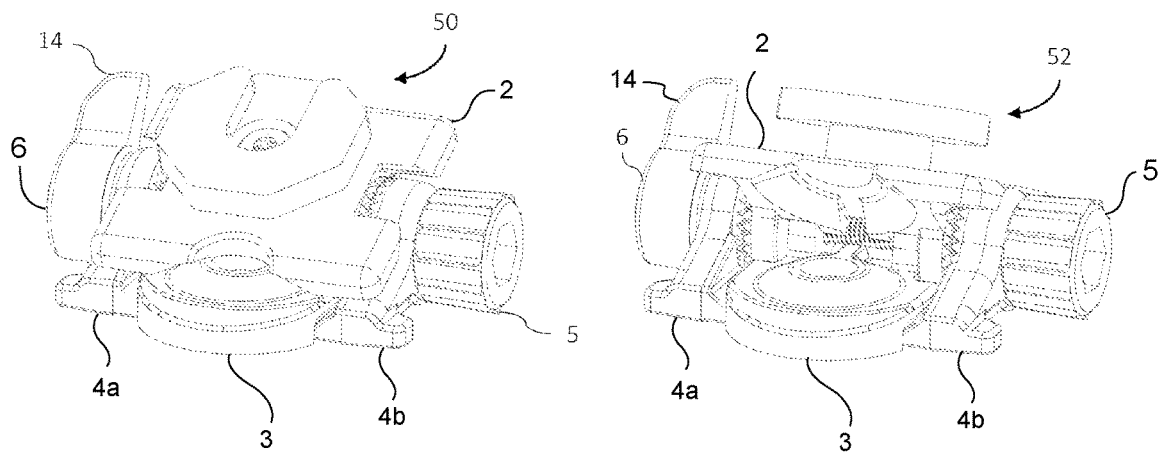
FIG. 5 is a diagram of multiple configurations of an articulating joint, according to one or more aspects described herein.
Figure 5:
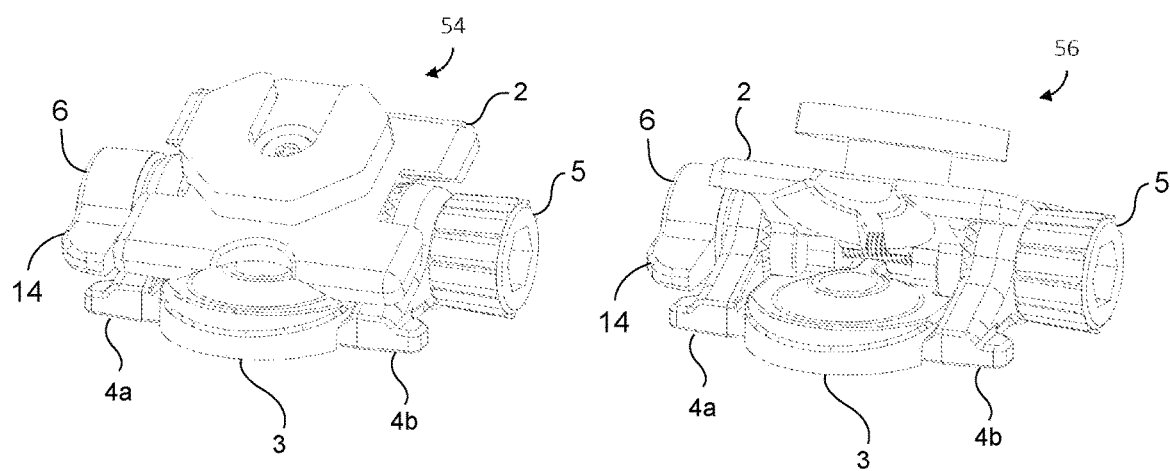

In various embodiments, one or more components of articulating joint 1 and/or the base assembly may be tightened and/or loosened to control articulation of platform 2 into (or between) various orientations (e.g., as further described with reference to FIG. 5). For example, loosening components of the base assembly along axis 12 may enable platform 2 to be in an open state whereby platform 2 may articulate into various orientations (e.g., by decreasing engagement between platform 12 and wedge 4A and/or wedge 4B, as discussed further herein). Tightening components of the base assembly along axis 12 may cause platform 2 to be in a locked state whereby platform 2 is unable to articulate into various orientations (e.g., by increasing engagement between platform 12 and wedge 4A and/or wedge 4B, as discussed further herein). In various embodiments, loosening (e.g., rotating counterclockwise, decreasing thread engagement of, etc.) threaded fastener 9 relative to threaded insert 7 of nub 6 enables platform 2 to be articulated among a plurality of orientations as shown in FIG. 5. The pitch of the teeth (e.g., first set of teeth 20a/40a and second set of teeth 20b/40b) may define the degree of rotation between each of the plurality of orientations. For example, first set of teeth 20a/40a and second set of teeth 20b/40b may engage one another in angular steps. For example, the angular step may be between 0.1 degrees and 0.25 degrees, between 0.25 degrees and 0.5 degrees, between 0.5 degrees and 1 degree, and between 1 degree and 2 degrees. In various embodiments, tightening (e.g., rotating clockwise, increasing thread engagement of, etc.) threaded fastener 9 relative to threaded insert 7 retains platform 2 in a particular orientation relative to base 3 in a locked position.

Figure 2:
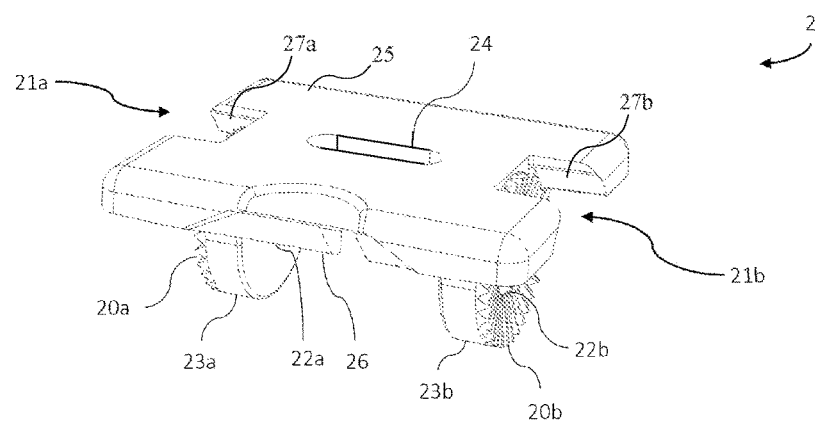
FIG. 2 is a perspective view of an embodiment of a platform of an articulating joint, according to one or more aspects described herein.

FIG. 2 shows a perspective view of a platform 2, in accordance with various embodiments. Platform 2 may comprise a surface 25 (e.g., a receiving surface) having a first end 21a (e.g., first platform end, etc.) opposite a second end 21b (e.g., second platform end, etc.). Surface 25 may include a mounting feature 24. In an embodiment, mounting feature 24 enables fastener 11 to couple coupler 10 with platform 2. Mounting feature 24 may prevent rotation of coupler 10 relative to platform 2. Mounting feature 24 may comprise a structure such as a recess and/or protrusion configured to engage coupler 10 to lock an orientation of coupler 10 relative to platform 2. In various embodiments, coupler 10 may also be coupled to surface 25 using any other suitable technique. In various embodiments, coupler 10 and platform 2 may comprise a unitary object.

In various embodiments, platform 2 may comprise a hinge (e.g., a first hinge, a platform hinge, etc.). The hinge may be configured to interact with the base assembly, such as base 3 and/or wedges 4a and 4b, to enable articulating joint 1 to articulate between orientations. The hinge may extend perpendicularly from surface 25 between first end 21a and second end 21b. The hinge may comprise a single structure configured to enable articulation of articulating joint 1. The hinge may also comprise a plurality of structures configured to enable articulation of articulating joint 1. For example, the hinge may comprise a first hinge joint and a second hinge joint. The first hinge joint may extend downward from surface 25 proximate first end 21a. The second hinge joint may extend downward from surface 25 proximate second end 21b.

In various embodiments, dd and a second wheel, such as second tab 23b (e.g., second tab, second platform tab, etc.). Each of first tab 23a and second tab 23b may extend perpendicularly from surface 25 of platform 2. First tab 23a may include a hole (e.g., passageway, thru hole, bore, etc.), such as first hole 22a (obscured from view). Second tab 23b may comprise a hole, such as second hole 22b. In various embodiments, platform 2 may comprise a hinge extending between first end 21a and second end 21b, such that first hole 22a is contiguous with second hole 22b. Second hole 22b may be concentric with a first hole 22a of first tab 23a.

First tab 23a may include a first set of teeth 20a. First set of teeth 20a may be positioned radially around first hole 22a. First set of teeth 20a may circumscribe first hole 22a. First set of teeth 20a may project outward from first tab 23a toward first end 21a of platform 2. In various embodiments, second tab 23b may include a second set of teeth 20b. Second set of teeth 20b may be positioned radially around second hole 22b. Second set of teeth 20b may circumscribe second hole 22a. Second set of teeth 20b may project outward from second tab 23b toward second end 21b of platform 2. A number of teeth of first set of teeth 20a may be equal to the number of teeth of second set of teeth 20b. First set of teeth 20a and second set of teeth 20b may be tapered and configured to mesh with other sets of teeth described further herein. First set of teeth 20a and second set of teeth 20b may comprise a profile similar to that found in a common Hirth coupling.

In various embodiments, platform 2 may include one or more reliefs. A relief may define a portion of surface 25 configured to receive one or more components of articulating joint 1. For example, a relief may define a void, recess, or the like on surface 25. As a further example, a relief may comprise a portion of surface 25 having a thickness less than a thickness of surface 25 (e.g., a relief thickness is less than an average thickness of surface 25). The one or more reliefs may be configured to contribute to the low profile nature of articulating joint 1.

Platform 2 may comprise a relief 26 (e.g., first relief, dome relief, base relief, etc.). Relief 26 may define a portion of surface 25 configured to at least partially receive dome 36 of base 3 (with brief reference to FIG. 3). In that regard, relief 26 may be sized and shaped to at least partially receive dome 36. For example, relief 26 may define a full recess, a partial recess, and/or a decreased thickness in surface 25 between first end 21a and second end 21b. Relief 26 may be configured to at least partially reduce interference of surface 25 with dome 36 in response to articulating joint 1 being articulated into one or more orientations (e.g., as depicted in configurations 50 and 54, with brief reference to FIG. 5).

Platform 2 may comprise one or more tab reliefs, such as, for example, a first tab relief 27a (e.g., second relief, etc.) and a second tab relief 27b (e.g., third relief, etc.). First tab relief 27a may define a portion of surface 25 configured to at least partially receive first tab 23a. In that regard, first tab relief 27a may be sized and shaped to at least partially receive first tab 23a. For example, first tab relief 27a may define a full recess, a partial recess, and/or a decreased thickness in surface 25 proximate first end 21a. First tab relief 27a may be configured to allow first tab 23a to interface with first wedge 4a. For example, first tab relief 27a may be sized and shaped to enable first set of teeth 20a of first tab 23a to interface with first set of teeth 40a of first wedge 4a, while still enabling articulating joint 1 to maintain a low profile (as discussed further herein). Second tab relief 27b may define a portion of surface 25 configured to at least partially receive second tab 23b. In that regard, second tab relief 27b may be sized and shaped to at least partially receive second tab 23b. For example, second tab relief 27b may define a full recess, a partial recess, and/or a decreased thickness in surface 25 proximate second end 21b. Second tab relief 27b may be configured to allow second tab 23b to interface with first wedge 4b. For example, second tab relief 27b may be sized and shaped to enable second set of teeth 20b of second tab 23b to interface with second set of teeth 40b of second wedge 4b, while still enabling articulating joint 1 to maintain a low profile (as discussed further herein).

Figure 3:
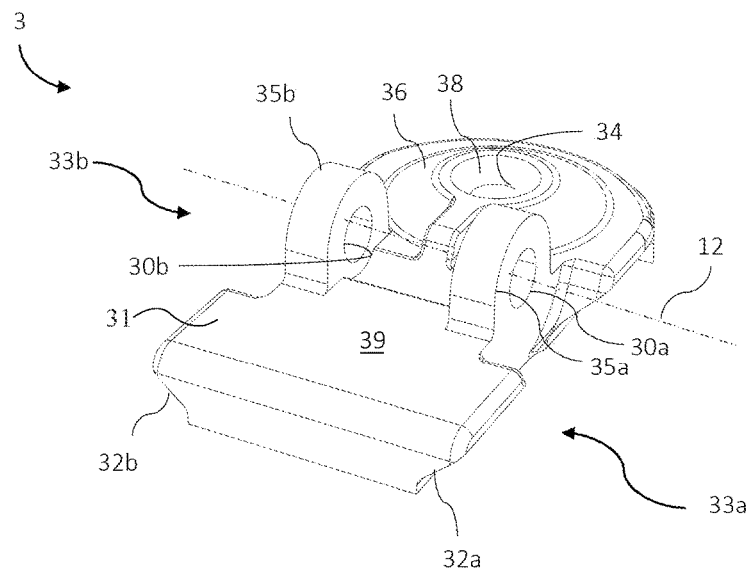
FIG. 3 is a perspective view of an implementation of a base of an articulating joint, according to one or more aspects described herein.

FIG. 3 shows a perspective view of a base 3, in accordance with various embodiments. Base 3 may comprise a body 31 having a first end 33a (e.g., third end, first base end, etc.) opposite a second end 33b (e.g., fourth end, second base end, etc.). Body 31 may include a top surface 39, a hinge (e.g., second hinge, base hinge, complementary hinge, etc.), and/or a dome 36. The hinge may be configured to interact with platform 2, and/or wedges 4a and 4b, to enable articulating joint 1 to articulate between orientations. The hinge may be located between top surface 29 and dome 36 and extend perpendicularly from base 3. The hinge may be complementary with the hinge of platform 2. The complementary hinge may be configured to cooperate with the hinge of platform 2. The hinge may comprise a single structure configured to enable articulation of articulating joint 1. The hinge may also comprise a plurality of structures configured to enable articulation of articulating joint 1. For example, the hinge may comprise a first hinge joint and a second hinge joint. The first hinge joint may extend from base 3 proximate first end 33a. The second hinge joint may extend from base 3 proximate second end 33b.

In various embodiments, the hinge may comprise a first tab 35a (e.g., third tab, first base tab, etc.) and a second tab 35b (e.g., fourth tab, second base tab, etc.). First tab 35a may extend perpendicular from first end 33a. Second tab 35b may extend perpendicular from second end 33b. In various embodiments, first tab 35a may include a first hole 30a, and second tab 35b may include a second hole 30b. In various embodiments, base 3 may comprise a complementary hinge extending between first end 33a and second end 33b, such that first hole 30a is contiguous with second hole 30b. Second hole 30b may be concentric with first hole 30a along axis 12.

Base 3 may further comprise a mounting hole, such as hole 34. Hole 34 may define a void through dome 36. Hole 34 may be configured to receive a fastener for coupling base 3 to a support, accessory, or other structure. In various embodiments, hole 34 may comprise a chamfer 38 configured to receive a flat head countersink fastener. In embodiments, a region of material on base 3, such as dome 36, may gradually change thickness to transfer axial clamping force of a fastener across base 3. A shape, size, and/or thickness of dome 36 may be configured to minimize an overall thickness of articulating joint 1. In some embodiments, a double-sided adhesive may be used to couple body 3 to one of an accessory and a support.

In various embodiments, base 3 may include one or more recesses. A recess may define a portion of body 31 (e.g., a female receptacle) configured to receive a portion of wedge 4a or wedge 4b (e.g., a male connector). For example, a recess may define a void, recess, receptable, or the like on body 31. As a further example, a recess may define a portion of body 31 having a thickness less than a thickness of body 31 (e.g., a recess thickness is less than an average thickness of body 31). Each recess may be located on a bottom and/or side portion of body 31, proximate first end 33a and/or second end 33b.

In various embodiments, base 3 may include one or more recesses such as a first undercut 32a (e.g., a first recess, a first dovetail, etc.) and a second undercut 32b (e.g., a second recess, a second dovetail, etc.). First undercut 32a may be sized and shaped to receive a portion of first wedge 4a. In that regard, first undercut 32a may comprise any suitable shape configured to receive a portion of first wedge 4a, such as, for example, a square shape, a rectangular shape, a dovetail shape, a dado shape, etc. First undercut 32a may define a recess in body 31 encompassing a portion of a bottom of body 31 and first end 33a. In various embodiments, first undercut 32a may define a single recess encompassing a portion of a bottom of body 31 and first end 33a extending from a first edge of base 3 proximate top surface 39 to a second edge of base 3 proximate dome 36. The single recess may be configured to receive one or more portions of first wedge 4a (e.g., a first foot in the single recess, a first foot and a second foot in the single recess, etc.). In various embodiments, first undercut 32a may define a plurality of recesses encompassing separate and discrete portions of a bottom of body 31 and first end 33a. The plurality of recesses may each be configured to receive separate portions of first wedge 4a (e.g., a first foot in a first recess and a second foot in a second recess, a first foot and a second foot in a first recess and a third foot in a second recess, etc.).

Second undercut 32b may define a recess in body 31 encompassing a portion of a bottom of body 31 and second end 33b. Second undercut 32b may be sized and shaped to receive a portion of second wedge 4b. In that regard, second undercut 32b may comprise any suitable shape configured to receive a portion of second wedge 4b, such as, for example, a square shape, a rectangular shape, a dovetail shape, a dado shape, etc. Second undercut 32b may define a recess in body 31 encompassing a portion of a bottom of body 31 and second end 33b. In various embodiments, second undercut 32b may define a single recess encompassing a portion of a bottom of body 31 and second end 33b extending from a first edge of base 3 proximate top surface 39 to a second edge of base 3 proximate dome 36. The single recess may be configured to receive one or more portions of second wedge 4b (e.g., a first foot in the single recess, a first foot and a second foot in the single recess, etc.). In various embodiments, second undercut 32b may define a plurality of recesses encompassing separate and discrete portions of a bottom of body 31 and second end 33b. The plurality of recesses may each be configured to receive separate portions of second wedge 4b (e.g., a first foot in a first recess and a second foot in a second recess, a first foot and a second foot in a first recess and a third foot in a second recess, etc.).

Figure 4:
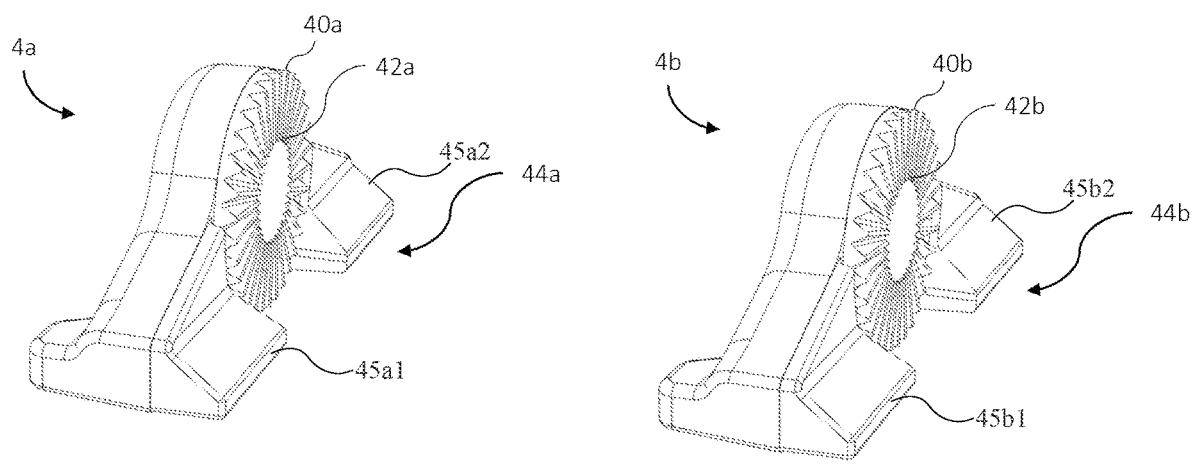
FIG. 4 is a perspective view of an embodiment of a wedge of an articulating joint, according to one or more aspects described herein.

First undercut 32a and second undercut 32b may form acute angles with first end 33a and second end 33b of base 3, respectively. First undercut 32a and second undercut 32b may be understood in the art as dovetails, therefore base 3 may also be understood as a dovetail base. First undercut 32a and second undercut 32b may be configured to releasably engage (e.g., cooperate, interface, etc.) with first wedge 4a and second wedge 4b, respectively. FIG. 4 depicts an embodiment of first wedge 4a and second wedge 4b configured to releasably engage first undercut 32a and second undercut 32b.

As illustrated in FIG. 4, first wedge 4a and second wedge 4b may comprise similar shapes and characteristics with one another. In that regard, first wedge 4a and second wedge 4b may be interchangeable and may be configured to perform the same operations based on orientation (e.g., first wedge 4a can replace second wedge 4b to perform the operations of second wedge 4b in articulating joint 1, second wedge 4b can replace first wedge 4a to perform the operations of first wedge 4a in articulating joint 1, etc.).

First wedge 4a may comprise a first acute edge 44a (e.g., first ramp, first foot, first protrusion, etc.). First acute edge 44a may be configured to releasably engage first undercut 32a of base 3. First acute edge 44a may be sized and shaped to engage first undercut 32a. For example, first acute edge 44a may comprise a size and shape complimentary with first undercut 32a. In that regard, first acute edge 44a may comprise a square shape, a rectangular shape, a dovetail shape, a dado shape, etc., based on the size and shape of first undercut 32a. In various embodiments, first acute edge 44a may comprise one or more protrusions (e.g., feet, ramps, etc.) extending from first wedge 4a. For example, first acute edge 44a may comprise a first protrusion 45a1 and a second protrusion 45a2. First protrusion 45a1 and second protrusion 45a2 may be configured to engage first undercut 32a of base 3. For example, in response to first undercut 32a comprising a single recess, first protrusion 45a1 and second protrusion 45a2 may be both configured to engage the single recess. In response to first undercut 32a comprising a first recess and a single recess, first protrusion 45a1 may be configured to engage the first recess and second protrusion 45a2 may be configured to engage the second recess.

First wedge 4a may further comprise a first hole 42a. In various embodiments, first hole 42a may be circumscribed by first set of teeth 40a. First set of teeth 40a may be positioned radially around first hole 42a. First set of teeth 40a may project outward from first hole 42a toward first acute edge 44a. First set of teeth 40a may be configured to mesh with first set of teeth 20a of platform 2 in a locked position. In the locked position, first acute edge 44a may be configured to releasably engage first undercut 32a of base 3. In various embodiments, a portion of the outer surface of first wedge 4a defining a circumferential edge of first hole 42a may not comprise first set of teeth 40a. The surface may be flat and/or recessed. The surface may be sized and shaped to engage, abut, and/or retain compression spring 8a (e.g., a retaining surface).

Second wedge 4b may be similar to first wedge 4a and may comprise similar or same features and functionalities, such as, for example, a second set of teeth 40b, a second hole 42b, and/or a second acute edge 44b. Second acute edge 44b may be similar to first acute edge 44a. Second acute edge 44b (e.g., second ramp, second foot, second protrusion, etc.) may be configured to releasably engage second undercut 32b of base 3. Second acute edge 44b may be sized and shaped to engage second undercut 32b. For example, second acute edge 44b may comprise a size and shape complimentary with second undercut 32b. In that regard, second acute edge 44b may comprise a square shape, a rectangular shape, a dovetail shape, a dado shape, etc., based on the size and shape of second undercut 32b. In various embodiments, second acute edge 44b may comprise one or more protrusions (e.g., feet, ramps, etc.) extending from second wedge 4b. For example, second acute edge 44b may comprise a first protrusion 45b1 and a second protrusion 45b2. First protrusion 45b1 and second protrusion 45b2 may be configured to engage second undercut 32b of base 3. For example, in response to second undercut 32b comprising a single recess, first protrusion 45b1 and second protrusion 45b2 may be both configured to engage the single recess. In response to second undercut 32b comprising a first recess and a single recess, first protrusion 45b1 may be configured to engage the first recess and second protrusion 45b2 may be configured to engage the second recess.

Second hole 42b may be similar to first hole 42a, and second set of teeth 40b may be similar to first set of teeth 40a. In various embodiments, second hole 42b may be circumscribed by second set of teeth 40b. Second set of teeth 40b may be positioned radially around second hole 42b. Second set of teeth 40b may project outward from second hole 42b toward second acute edge 44b. Second set of teeth 40b may be configured to mesh with second set of teeth 20b of platform 2 in a locked position. In the locked position, second acute edge 44b may be configured to releasably engage second undercut 32b of base 3. In various embodiments, a portion of the outer surface of second wedge 4b defining a circumferential edge of second hole 42b may not comprise second set of teeth 40b. The surface may be flat and/or recessed. The surface may be sized and shaped to engage, abut, and/or retain compression spring 8b (e.g., a retaining surface).

In an embodiment of articulating joint 1, only first wedge 4a and first tab 23a of platform 2 have sets of teeth, such that in a locked position, only first set of teeth 40a of first wedge 4a and first set of teeth 20a of platform 2 are engaged. The material, profile, and/or geometry of any sets of teeth described herein may be configured to resist a predetermined amount of torque before deforming.

In various embodiments, first acute edge 44a of first wedge 4a may only comprise first protrusion 45a1 and second acute edge 44b of second wedge 4b may only comprise first protrusion 45b1. In that regard, when oriented in articulating joint 1, protrusions 45a1, 45b1 may be located on opposing sides of articulating joint 1. Having protrusions 45a1, 45b1 on opposing sides of articulating joint 1 may increase stability in articulating joint 1 during tightening, in contrast to having protrusions only on one same side of articulating joint 1.

In various embodiments, and with reference to FIGS. 1A-4, threaded fastener 9 couples the hinge of platform 2 (e.g., first tab 23a and second tab 23b) with the complementary hinge of base 3 (e.g., first tab 35a and second tab 35b) along axis 12. In some embodiments, threaded insert 7 is disposed within one of first hole 42a of first wedge 4a, first hole 30a of first tab 35a of base 3, and first hole 22a of platform 2. In that regard, threaded fastener 9 may be coupled to threaded insert 7 disposed within first hole 42a, first hole 30a, and/or first hole 22a. In other embodiments, threaded fastener 7 may be disposed within a nub, such as nub 6. In that regard, threaded fastener 9 may be coupled to nub 6. Nub 6 may have a lobular projection 14 (e.g., lobe, lever, etc.) extending from its diameter, to assist in tightening and loosening threaded faster 9 relative to threaded insert 7. Nub 6 may be disposed adjacent first wedge 4a. In various embodiments, nub 6 may be disposed adjacent first tab 35a of base 3 or first tab 23a of platform 2. In some embodiments, first wedge 4a may be rigidly coupled with and/or unitary with first side 33a of base 3.

FIG. 5 shows an example of various states of articulating joint 1. In a locked position, first set of teeth 42a of first wedge 4a may mesh (e.g., fully engage) with first set of teeth 20a of platform 2, thereby retaining platform 2 in a particular orientation relative to base 3. In a locked position, second set of teeth 42b of second wedge 4b may mesh with second set of teeth 20b of platform 2, thereby retaining platform 2 in a particular orientation relative to base 3. In a locked position, first acute edge 44a of first wedge 4a may cooperate with first undercut 32a of base 3 to secure platform 2 to base 3. In a locked position, translation of first acute edge 44a perpendicular to axis 12 may be restricted by first undercut 32a. In a locked position, second acute edge 44b of second wedge 4b may cooperate with second undercut 32b of base 3 to secure platform to base 3. In a locked position, translation of second acute edge 44b perpendicular to axis 12 may be restricted by second undercut 32b.

In various embodiments, in an unlocked position, first set of teeth 42a of first wedge 4a may be disengaged with first set of teeth 20a of platform 2, thereby enabling articulation of platform 2 relative to base 3 about axis 12. In an unlocked position, second set of teeth 42b of second wedge 4b may be disengaged with second set of teeth 20b of platform 2, thereby enabling articulation of platform 2 relative to base 3 about axis 12. In an unlocked positioned, first acute edge 44a of first wedge 4a may be disengaged with first undercut 32a of base 3. In an unlocked position, second acute edge 44b of second wedge 4b may disengaged with second undercut 32b of base 3.

Articulating platform 2 may also rotate about axis 12 from a maximum extent of rotation to a minimum extent of rotation over a plurality of discreet orientations (e.g., articulation states). The maximum extent of rotation and the minimum extent of rotation may be defined at orientations at which platform 2 may not articulate further in a direction in an unlocked position due to a mechanical stop. For example, at a maximum range of rotation, dome 36 of base 3 may contact relief 26 of platform 2. In various embodiments, at a minimum range of rotation, an outer edge of surface 25 of platform 2 may contact top surface 39 of base 3. In various embodiments, accessory 18 coupled to coupler 10 may contact top surface 39 of base 3.

In various embodiments, a range of rotation may be between the maximum extent of rotation and the minimum extent of rotation. For example, and in accordance with various embodiments, a range of rotation of platform 2 relative to base 3 may be between 10 degrees and 90 degrees. In various embodiments, a range of rotation of platform 2 relative to base 3 may be at any other degree interval between 10 degrees and 90 degrees. In various embodiments, a range of rotation of platform 2 relative to base 3 may be between 10 degrees and 15 degrees, between 15 degrees and 30 degrees, between 30 degrees and 45 degrees, and/or between 45 degrees and 90 degrees. The number of discreet articulation states may be determined by the geometry of first set of teeth 42a/42b and second set of teeth 20a/20b as discussed previously herein.

Articulating joint 1 may be locked into an articulation state by increasing thread engagement of threaded fastener 9 with threaded insert 7. Thread engagement may be increased by rotating knob 5, wherein rotation of knob 5 is coupled with rotation of threaded fastener 9. In various embodiments, a lever extending from nub 6, such as lobular projection 14, may enable a user to exert additional torque to tighten treaded fastener 9 relative to threaded insert 7. Lobular projection 14 may allow a user to impart greater torque with less force, thereby aiding in tightening and/or loosening threaded fastener 9. In another embodiment, nub 6 may have a plurality of ribs to improve grip. In embodiments, nub 6 and/or knob 5 may be rotated, or be prevented from being rotated, with tools, such as a hex wrench, slotted screwdriver, etc.

Articulating joint 1 may be free to rotate when first set of teeth 42a/20a and second set of teeth 42b/20b are disengaged with one another (e.g., in the unlocked position). Decreasing thread engagement of threaded fastener 9 with threaded insert 7 allows first set of teeth 42a/20a to separate from second set of teeth 42b/20b. In various embodiments, articulating joint 1 further comprises one or more springs to aid in separating first set of teeth 42a/20a and second set of teeth 42b/20b when loosening threaded fastener 9 from threaded insert 7. For example, articulating joint 1 may include a first compression spring 8a and/or a second compression spring 8b. First compression spring 8a may be disposed between first tab 23a of platform 2 and first wedge 4a. First compression spring 8a may exert a separating force on first tab 23a and first wedge 4a. The separating force may push first wedge 4a from first tab 23a as threaded fastener 9 is loosened from threaded insert 7. The separating force exerted by first compression spring 8a may cause first set of teeth 42a of first wedge 4a to separate from first set of teeth 20a of platform 2 in an unlocked position. In various embodiments, second compression spring 8b may be disposed between second tab 23b of platform 2 and second wedge 4b. Second compression spring 8b may exert a separating force on second tab 23b and second wedge 4b. The separating force may push second wedge 4b from second tab 23b as threaded fastener 9 is loosened from threaded insert 7. The separating force exerted by second compression spring 8b may cause second set of teeth 42b of second wedge 4b to separate from second set of teeth 20b of platform 2 in an unlocked position.

Configuration 50 as illustrated in FIG. 5 depicts articulating joint 1 in an unlocked position in which platform 2 is at a maximum extent of rotation. Platform 2 is at a maximum extent of rotation when a mechanical stop prevents platform 2 from rotating further in a direction. In an embodiment, a mechanical stop is determined by dome 36 contacting relief 26. In an unlocked position in which platform 2 is at a maximum extent of rotation, first compression spring 8a acts on first wedge 4a and first tab 23a of platform 2 to separate first set of teeth 42a of first wedge 4a and first set teeth 20a of first tab 23a of platform 3. Second compression spring 8b acts on second wedge 4b and second tab 23b of platform 2, providing an opposing force between second set of teeth 42b of second wedge 4b and second set of teeth 20b of second tab 23b of platform 2. The force of first compression spring 8a and second compression spring 8b may be overcome by manual rotation of knob 5, threaded fastener 9, and/or nub 6 (e.g., to rotate threaded fastener 9 causing articulating joint 1 to move into the locked position).

Configuration 52 illustrates articulating joint 1 in an unlocked position in which articulating platform 2 is at a minimum extent of rotation. Articulating platform is at a minimum extent of rotation when a mechanical stop prevents platform 2 from further rotation in a direction opposite the direction of maximum rotation. For example, at the minimum extent of rotation, a surface of platform 2 may contact a top surface of base 3, such as top surface 39 (with brief reference to FIG. 3). In an unlocked position in which platform 2 is at a minimum extent of rotation, first compression spring 8a acts on first wedge 4a and first tab 23a of platform 2 to separate first set of teeth 42a of first wedge 4a and first set teeth 20a of first tab 23a of platform 3. Second compression spring 8b acts on second wedge 4b and second tab 23b of platform 2, providing an opposing force between second set of teeth 42b of second wedge 4b and second set of teeth 20b of second tab 23b of platform 2. The force of first compression spring 8a and second compression spring 8b may be overcome by manual rotation of knob 5, threaded fastener 9, and/or nub 6 (e.g., to rotate threaded fastener 9 causing articulating joint 1 to move into the locked position).

Configuration 54 shows articulating joint 1 in a locked position in which platform 2 is at a maximum extent of rotation with respect to base 3. Configuration 56 illustrates articulating joint 1 in a locked position in which platform 2 is at a minimum extent of rotation relative to base 3. In a locked position in which platform 2 is at a maximum extent of rotation or a minimum extent of rotation, first set of teeth 42a/20a are fully engaged with second set of teeth 42b/20b. In a locked position, first compression spring 8a and/or second compression spring 8b may each have a compressed length. In the unlocked position, first compression spring 8a and/or second compression spring 8b may each have a relaxed length. The compressed length may be shorter than the relaxed length.

In various embodiments, a method of articulating an articulating joint 1 may include passing threaded fastener 9 through a combination of first hole 42a of first wedge 4a, complementary hinge of base 3, hinge of platform 2, first compression spring 8a, second compression spring 8b, and second hole 42b of second wedge 4b. After passing threaded fastener 9 through the combination of components of articulating joint 1, threaded fastener 9 may be at least partially threaded into threaded insert 7. Prior to fully tightening threaded fastener 9 in a locking direction (e.g., clockwise), platform 2 may be articulated to a desired (e.g., particular) orientation relative to base 3. Once platform 2 is articulated to the desired position, threaded fastener 9 may be rotated in the locking direction until first set of teeth 42a mesh with first set of teeth 20a and/or second set of teeth 42b mesh with second set of teeth 20b. As threaded fastener 9 is rotated in the locking direction, engagement of first acute edge 44a and first undercut 32a and/or engagement of second acute edge 44b and second undercut 32b increases, thereby securing platform 2 relative to base 3. Rotating threaded fastener 9 in the locking direction may include grasping a gripping surface, such as knob 5 and/or nub 6, and turning the shaft in a clockwise direction.

Aspects of this disclosure may relate to an articulating joint for coupling a portable electronic device to a mount. The articulating joint may comprise an articulating platform extending from a first end to a second end defining a first plane. The articulating platform may comprise a mounting interface configured to releasably receive a portable electronic device, a first tab and a second tab, where each of the first tab and the second tab are perpendicular to the first plane and extend from the first end and the second end of the articulating platform, respectively. Each of the first tab and the second tab of the articulating platform may comprise an outer surface and an inner surface connected via a passageway along a first axis that is parallel to the first plane, wherein at least one of the outer surfaces of the tabs may comprise a first set of radial teeth circumscribing the passageway. The articulating joint may further comprise a unitary base having a platform, where the platform includes a first tab and a second tab. Each of the first tab of the platform and the second tab of the platform may be perpendicular to the first platform of the unitary base and extend from a first end and to a second end of the unitary base. Each of the first tab of the platform and the second tab of the platform may have an outer surface and an inner surface connected via a passageway of the unitary base along a second axis that is parallel to the platform of the unitary base. A portion of the first end of the unitary base and a portion of the second end of the unitary base may each terminate in an acute angle. The platform of the unitary base may have an inner perimeter defining a bore of the unitary base. The bore of the unitary base may extend from the platform to a lower surface and be configured to receive a fastener to fasten an imaging device to the unitary base. A first coupling wedge and a second coupling wedge, each extending from a first end to a second end, may be configured to releasably engage at least a part of the portion of the first end and the second end of the unitary base, respectively. Each of the coupling wedges may comprise an outer surface and an inner surface connected via a passageway, where at least one of the inner surfaces of the wedges may comprise a set of radial teeth circumscribing the passageway. An axle having a threaded portion may be configured to pass through and align each of the passageways, and first and second axes, to create a unitary axis of rotation. The articulating joint may include at least one of: a first compression spring configured to be positioned between the first tab of the first coupling wedge and the first tab of the articulating platform along the axis of rotation; a second compression spring configured to be positioned between the second tab of the second coupling wedge and the second tab of the articulating platform along the axis of rotation; and combinations thereof. The articulating joint may include a knob having an inner perimeter defining a hole, where the knob is configured to be positioned on a face opposite the first set of radial teeth of the first tab of the first coupling wedge along the axis of rotation. The articulating joint may comprise a lobular nut configured to be coupled to a part of the threaded region of the axle.

Another aspect of this disclosure may relate to an articulating joint having an articulating platform extending from a first end to a second end defining a first plane. The articulating platform may have a first tab perpendicular to the first plane, which extends from the first end of the articulating platform. The first tab may comprise a first inner perimeter defining a first hole, where a first set of radial teeth circumscribe the first hole. The second tab may extend perpendicular to the first plane and extend from the second end of the articulating platform. The second tab may comprise a second inner perimeter defining a second hole, where the first hole of the first tab concentrically aligns with the second hole along a first axis. The articulating joint may comprise a first coupling wedge extending from a first end to a second end, where the first end forms a first acute angle. The first coupling wedge may comprise a first inner perimeter defining a first hole, where a first set of radial teeth circumscribe the first hole and are configured to mesh with the first set of radial teeth of the articulating platform in a locked state. The articulating joint may comprise a second coupling wedge extending from a first end to a second end where the second end forms a second acute angle. The articulating joint may comprise a nut having a threaded region where the threaded region is configured to concentrically align with the first axis. The articulating joint may comprise a dovetail base extending from a first end to a second end where the first end forms a first acute angle and the second end forms a second acute angle, which are each configured to releasably engage the first acute angle of the first coupling wedge and the second acute angle of the second coupling wedge, respectively. The articulating joint may comprise a threaded screw configured to couple together the first hole of the first coupling wedge, the first hole and the second hole of the articulating platform, and the second hole of the second coupling wedge, where the threaded screw terminates in the threaded region of the lobular nut in a plurality of locked states. The plurality of locked states may allow a range of articulation of the articulating platform.

Implementations of the articulating joint include where one or more compression springs are configured to concentrically align with the threaded nut and act on the first set of radial teeth of the first coupling wedge and the first tab of the articulating platform. Other implementations include where the dovetail base further comprises one or more inner perimeters defining a one or more holes, where one or more fasteners may couple the dovetail base to an imaging device via the one or more holes. Even other implementations include where a /double-sided adhesive couples the dovetail base to the imaging device.

Aspects of this disclosure may relate to an articulating joint apparatus, system, and methods thereof. A first exemplary embodiment of an articulating joint apparatus may comprise: an articulating platform having a first wheel and a second wheel, where the first wheel includes a first bore having a first set of teeth positioned radially around the first bore, and the second wheel includes a second bore concentric with the first bore; a base extending from a first side having a first undercut to a second side, the base comprising a first tab and a second tab opposite the first tab, where the first tab has a first thru hole and the second tab has a second thru hole concentric with the first thru hole; a first wedge having a first ramp configured to engage the first undercut of the first side of the base, the first ramp having a third bore and a third set of teeth positioned radially around the third bore; a threaded insert; and a shaft having a threaded portion, the threaded portion configured to engage the threaded insert, the shaft passing through the third bore of the first wedge, the first bore of the first wheel of the articulating platform, the first thru hole of the first tab of the base, and the second bore of the second wheel of the articulating platform; where: increasing engagement of the threaded region of the shaft with the threaded insert causes the first set of teeth of the first wheel of the articulating platform to mesh with the third set of teeth of the first wedge to fix the articulating platform in an orientation relative to the base, and causes the first ramp of the first wedge to engage the first undercut of the first side of the base to secure the articulating platform to the base.

A second exemplary embodiment may include the apparatus of the first exemplary embodiment, further comprising a second wedge having a second ramp configured to engage a second undercut of the second side of the base, the second wedge having a fourth bore, where: the shaft passes through the fourth bore of the second wedge; and increasing engagement of the threaded region of the shaft with the threaded insert causes the second ramp of the second wedge to engage the second undercut of the second side of the base to secure the articulating platform to the base.

A third exemplary embodiment may include the apparatus of the first exemplary embodiment, where: the second wheel of the articulating platform includes a second set of teeth positioned radially around the second bore; and the second ramp includes a fourth set of teeth positioned radially around the fourth bore; where: increasing engagement of the threaded region of the shaft with the threaded insert causes the second set of teeth of the second wheel of the articulating platform to mesh with the fourth set of teeth of the second ramp to fix the articulating platform in the orientation relative to the base.

A fourth exemplary embodiment may include the apparatus of claim 2 where the threaded insert is disposed in the fourth bore of the second ramp.

A fifth exemplary embodiment may include the apparatus as in any of the preceding exemplary embodiments, in which the base further comprises a mounting thru hole disposed between the first tab and the second tab.

A sixth exemplary embodiment may include the apparatus in any one of the first exemplary embodiment, the second exemplary embodiment, and the third exemplary embodiment, in which a first end of the shaft terminates in a knob having a gripping surface.

A seventh exemplary embodiment may include the apparatus as in the first exemplary embodiment, the second exemplary embodiment, or the third exemplary embodiment, further comprising compression spring disposed between the first wheel of the articulating platform and the first wedge; where: the shaft passes through the compression spring; and the compression spring provides a separating force between the first wheel of the articulating platform and the first wedge.

An eighth exemplary embodiment may include the apparatus as in any one of the first exemplary embodiment, the second exemplary embodiment, and the third exemplary embodiment, in which: the articulating platform includes a receiving surface configured to receive one of an accessory and a support; the first wheel of the articulating platform extends perpendicular to the receiving surface; and the second wheel of the articulating platform extends perpendicular to the receiving surface.

A ninth embodiment may include the apparatus as in the first exemplary embodiment, the second exemplary embodiment, or the third exemplary embodiment, further comprising a nub having a lobular projection, where: the threaded insert is disposed in the nub; and the lobular projection is configured to assist in regulating engagement of the threaded region of the shaft with the threaded insert.

A tenth exemplary embodiment may include the apparatus as in any one of the first exemplary embodiment, the second exemplary embodiment, and the third exemplary embodiment, in which the threaded insert is disposed in one of the second thru hole of the second tab of the base and the second bore of the second wheel of the articulating platform.

An eleventh exemplary embodiment may include a system for coupling a provided accessory to a provided support worn by a person, the system comprising: a platform having a hinge extending from a first end to a second end opposite the first end, the hinge having a bore therethrough, the platform couplable to one of the accessory and the support, wherein the first end of the hinge includes a set of teeth positioned radially around the bore; a base extending from a first side having a first undercut to a second side, the base couplable to the other of the accessory and the support, the base having a complementary hinge extending between the first side and the second side, wherein the complementary hinge has a thru hole therethrough, and the thru hole of the complementary hinge is concentric with the bore of the hinge of the platform; a first wedge having a first ramp configured to cooperate with the first undercut of the first side of the base, the first ramp having a first passageway and a first complementary set of teeth positioned radially around the first passageway; a threaded insert; and a shaft having a threaded portion, the threaded portion configured to engage the threaded insert, the shaft passing through the first passageway of the first wedge, the bore of the hinge of the platform, and the thru hole of the complementary hinge of the base, the shaft rotatable in a first direction to a locked position; wherein: the set of teeth of the hinge of the platform cooperates with the first complementary set of teeth of the first wedge to retain the platform in an orientation relative to the base in the locked position; and the first ramp of the first wedge cooperates with the first undercut of the first side of the base to secure the platform to the base in the locked position.

A twelfth exemplary embodiment may include the system of the eleventh exemplary embodiment further comprising a second wedge having a second ramp configured to engage a second undercut of the second side of the base, the second wedge having a second passageway; where: the shaft passes through the second passageway of the second wedge; and the second ramp of the second wedge cooperates with the second undercut of the second side of the base to secure the platform to the base in the locked position.

A thirteenth exemplary embodiment may include the system of the twelfth exemplary embodiment, where the threaded insert is disposed in the second passageway of the second ramp.

A fourteenth exemplary embodiment may include the system as in any one of the eleventh exemplary embodiment, the twelfth exemplary embodiment, and the thirteenth exemplary embodiment, in which the second side of the hinge of the platform includes a second set of teeth positioned radially around the bore, and the second ramp includes a second complementary set of teeth positioned radially around the second passageway; where: the second set of teeth of the hinge of the platform cooperates with the second complementary set of teeth of the second wedge to retain the platform in the orientation relative to the base in the locked position.

A fifteenth exemplary embodiment may include the system as in the eleventh exemplary embodiment, the twelfth exemplary embodiment, or the thirteenth exemplary embodiment, further comprising a knob rigidly coupled to an end of the shaft, the knob having a gripping surface.

A sixteenth exemplary embodiment may include the system as in the eleventh exemplary embodiment, the twelfth exemplary embodiment, or the thirteenth exemplary embodiment, further comprising a compression spring disposed between the first end of the hinge of the platform and the first wedge, where: the shaft passes through the compression spring; and the compression spring provides a separating force between the first wedge and the platform.

A seventeenth exemplary embodiment may include the system as in any one of the eleventh exemplary embodiment and the twelfth exemplary embodiment in which the threaded insert is disposed proximate one of the second end of the hinge of the platform and the complementary hinge at the second side of the base.

An eighteenth exemplary embodiment may include the system as in either the eleventh exemplary embodiment or the twelfth exemplary embodiment, further comprising a nub having a lobular projection, where: the threaded insert is disposed in the nub; and while the shaft is rotated, the lobular projection is configured to assist in preventing the threaded insert from rotating.

A nineteenth exemplary embodiment may include a method of releasably securing a provided accessory to a provided support in a particular orientation using a platform that is fixed to one of the accessory and the support and a base that is fixed to the other of the accessory and the support, the method comprising: passing a shaft having a threaded region through a passageway of a wedge, a bore of a hinge of the platform, and a thru hole of a complementary hinge of the base to couple the wedge, the platform, and the base; rotating the platform to the particular orientation relative to the base; and rotating the shaft in a locking direction to engage a threaded insert; where: rotating the shaft in the locking direction causes teeth of the hinge of the platform to mesh with complementary teeth of the wedge to retain the platform in the particular orientation relative to the base in a locked position, and causes a ramp of the wedge to engage an undercut of the base to secure the platform to the base in the locked position.

A twentieth exemplary embodiment may include the method of the nineteenth exemplary embodiment where rotating the shaft in the locking direction comprises grasping a gripping surface of the shaft and turning the shaft in a clockwise direction The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The words "herein", "hereunder", "above", "below", and any other word that refers to a location, whether specific or general, in the specification shall refer to any location in the specification.

What is claimed is:

1. A low profile articulating joint apparatus comprising:
an articulating platform comprising a first wheel and a second wheel, wherein the first wheel includes a first bore having a first set of teeth positioned radially around the first bore, and the second wheel includes a second bore concentric with the first bore;
a base comprising a first side opposite a second side, wherein the first side defines a first undercut, the base comprises a first tab and a second tab opposite the first tab, the first tab includes a first thru hole, and the second tab includes a second thru hole concentric with the first thru hole;
a first wedge comprising a first ramp configured to engage the first undercut of the first side of the base, wherein the first ramp comprises a third bore and a third set of teeth positioned radially around the third bore;
a threaded insert; and
a shaft comprising a threaded portion configured to engage the threaded insert, wherein the shaft is disposed through the third bore of the first wedge, the first bore of the first wheel of the articulating platform, the first thru hole of the first tab of the base, and the second bore of the second wheel of the articulating platform; wherein:
increasing engagement of the threaded portion of the shaft with the threaded insert causes the first set of teeth of the first wheel of the articulating platform to mesh with the third set of teeth of the first wedge to fix the articulating platform in an orientation relative to the base, and causes the first ramp of the first wedge to engage the first undercut of the first side of the base to secure the articulating platform to the base.

2. The apparatus of claim 1 further comprising:
a second wedge comprising a second ramp configured to engage a second undercut of the second side of the base, wherein the second wedge comprises a fourth bore, and the shaft is disposed through the fourth bore of the second wedge; wherein:
increasing engagement of the threaded portion of the shaft with the threaded insert causes the second ramp of the second wedge to engage the second undercut of the second side of the base to secure the articulating platform to the base.

3. The apparatus of claim 2 wherein:
the second wheel of the articulating platform includes a second set of teeth positioned radially around the second bore; and
the second wedge includes a fourth set of teeth positioned radially around the fourth bore; wherein:
increasing engagement of the threaded portion of the shaft with the threaded insert causes the second set of teeth of the second wheel of the articulating platform to mesh with the fourth set of teeth of the second wedge to fix the articulating platform in the orientation relative to the base.

4. The apparatus of claim 2 wherein the threaded insert is disposed through the fourth bore of the second ramp.

5. The apparatus of claim 1 wherein the base further comprises a mounting thru hole disposed between the first tab and the second tab.

6. The apparatus of claim 1 wherein a first end of the shaft terminates in a knob having a gripping surface.

7. The apparatus of claim 1 further comprising a compression spring disposed between the first wheel of the articulating platform and the first wedge; wherein:
the shaft is disposed through the compression spring; and
the compression spring provides a separating force between the first wheel of the articulating platform and the first wedge.

8. The apparatus of claim 1 wherein:
the articulating platform includes a receiving surface configured to receive one of an accessory and a support;
the first wheel of the articulating platform extends perpendicular to the receiving surface; and
the second wheel of the articulating platform extends perpendicular to the receiving surface.

9. The apparatus of claim 1 further comprising a nub having a lobular projection, wherein:
the threaded insert is disposed in the nub; and
the lobular projection is configured to assist in regulating engagement of the threaded portion of the shaft with the threaded insert.

10. The apparatus of claim 1 wherein the threaded insert is disposed in the second thru hole of the second tab of the base.

11. A system for coupling a provided accessory to a provided support worn by a person, the system comprising:
a platform comprising a hinge extending from a first end of the platform to a second end of the platform, the hinge including a bore therethrough, the platform couplable to one of the accessory and the support, wherein the first end of the hinge includes a set of teeth positioned radially around the bore;
a base comprising a first side opposite a second side, the first side comprising a first undercut, the base couplable to the other of the accessory and the support, the base having a complementary hinge extending between the first side and the second side, wherein the complementary hinge includes a thru hole therethrough, and the thru hole of the complementary hinge is concentric with the bore of the hinge of the platform;
a first wedge having a first ramp configured to cooperate with the first undercut of the first side of the base, the first wedge having a first passageway and a first complementary set of teeth positioned radially around the first passageway;
a threaded insert; and
a shaft comprising a threaded portion, the threaded portion configured to engage the threaded insert, the shaft passing through the first passageway of the first wedge, the bore of the hinge of the platform, and the thru hole of the complementary hinge of the base, the shaft rotatable in a first direction to a locked position; wherein in the locked position:

the set of teeth of the hinge of the platform cooperates with the first complementary set of teeth of the first wedge to retain the platform in an orientation relative to the base; and the first ramp of the first wedge cooperates with the first undercut of the first side of the base to secure the platform to the base.

12. The system of claim 11 further comprising a second wedge including a second ramp configured to engage a second undercut of the second side of the base, the second wedge including a second passageway; wherein:

the shaft passes through the second passageway of the second wedge; and the second ramp of the second wedge cooperates with the second undercut of the second side of the base to secure the platform to the base in the locked position.

13. The system of claim 12 wherein the second side of the hinge of the platform includes a second set of teeth positioned radially around the bore, and the second ramp includes a second complementary set of teeth positioned radially around the second passageway; wherein:

the second set of teeth of the hinge of the platform cooperates with the second complementary set of teeth of the second wedge to retain the platform in the orientation relative to the base in the locked position.

14. The system of claim 12 wherein the threaded insert is disposed in the second passageway of the second ramp.

15. The system of claim 12 further comprising a nub having a lobular projection, wherein:

the threaded insert is disposed in the nub; and while the shaft is rotated, the lobular projection is configured to assist in preventing the threaded insert from rotating.

16. The system of claim 11 wherein the threaded insert is disposed proximate one of the second end of the hinge of the platform and the complementary hinge at the second side of the base.

17. The system of claim 11 further comprising a knob rigidly coupled to an end of the shaft, the knob having a gripping surface.

18. The system of claim 11 further comprising a compression spring disposed between the first end of the hinge of the platform and the first wedge, wherein:

the shaft passes through the compression spring; and the compression spring provides a separating force between the first wedge and the platform.

19. A method of releasably securing a provided accessory to a provided support in a particular orientation using a platform that is fixed to one of the accessory and the support and a base that is fixed to the other of the accessory and the support, the method comprising:

passing a shaft having a threaded region through a passageway of a wedge, a bore of a hinge of the platform, a first thru hole of a complimentary hinge of the base, and a second thru hole of the complimentary hinge of the base to couple the wedge, the platform, and the base;

rotating the platform to the particular orientation relative to the base; and rotating the shaft in a locking direction to engage a threaded insert; wherein:

rotating the shaft in the locking direction causes teeth of the hinge of the platform to mesh with complementary teeth of the wedge to retain the platform in the particular orientation relative to the base in a locked position, and causes a ramp of the wedge to engage an undercut of the base to secure the platform to the base in the locked position.

20. The method of claim 19 wherein rotating the shaft in the locking direction comprises turning the shaft in a clockwise direction.

* * * * *